United States Patent
Hsu

(10) Patent No.: US 9,961,528 B2
(45) Date of Patent: May 1, 2018

(54) METHODS AND SYSTEMS FOR REGISTERING DETECTION OF ELECTRONIC DEVICES

(71) Applicant: Noodoe Corporation, Taipei (TW)

(72) Inventor: Chih-Feng Hsu, Taipei (TW)

(73) Assignee: NOODOE CORPORATION, Taipei (TW)

( * ) Notice: Subject to any disclaimer, the term of this patent is extended or adjusted under 35 U.S.C. 154(b) by 59 days.

(21) Appl. No.: 15/237,771

(22) Filed: Aug. 16, 2016

(65) Prior Publication Data

US 2017/0078827 A1 Mar. 16, 2017

(30) Foreign Application Priority Data

Sep. 11, 2015 (TW) .............................. 104130022 A

(51) Int. Cl.
*H04W 4/00* (2018.01)
*H04W 8/00* (2009.01)

(52) U.S. Cl.
CPC ............. *H04W 4/70* (2018.02); *H04W 4/005* (2013.01); *H04W 4/008* (2013.01); *H04W 4/80* (2018.02); *H04W 8/005* (2013.01)

(58) Field of Classification Search
CPC .................................. H04W 4/008; H04N 1/00
See application file for complete search history.

(56) References Cited

U.S. PATENT DOCUMENTS

| 9,514,296 | B2* | 12/2016 | Kim ...................... G06F 21/34 |
| 2013/0217332 | A1 | 8/2013 | Altman et al. |
| 2015/0138376 | A1* | 5/2015 | Grob .................. H04N 1/00127 348/207.1 |
| 2016/0062572 | A1* | 3/2016 | Yang ..................... G06F 3/0482 715/835 |

FOREIGN PATENT DOCUMENTS

| CN | 104246529 A | 12/2014 |
| TW | 201110784 A | 3/2011 |
| TW | 201531124 A | 8/2015 |

* cited by examiner

*Primary Examiner* — Shukri Taha
(74) *Attorney, Agent, or Firm* — McClure, Qualey & Rodack, LLP

(57) ABSTRACT

Methods and systems for registering detection of electronic devices are provided. First, a first signal is wirelessly received by an electronic device, wherein the first signal is broadcasted by a first electronic device, and the first signal at least includes identification data and specific information corresponding to the first electronic device. The specific information includes motion information of the first electronic device, or specific data generated based on the motion information. Then, a registration process is performed for the first signal by first determining whether the specific information conforms to predefined information. When the specific information conforms to predefined information, the identification data corresponding to the first electronic device is registered. Signals having the registered identification data will be further processed in the electronic device.

9 Claims, 7 Drawing Sheets

METHODS AND SYSTEMS FOR REGISTERING DETECTION OF ELECTRONIC DEVICES

BACKGROUND OF THE INVENTION

Field of the Invention

The disclosure relates generally to detection management methods and systems, and, more particularly to methods and systems that can perform a registration process for electronic devices, and perform related detection managements for the registered electronic devices.

Description of the Related Art

Recently, electronic devices, such as smart phones, tablets, notebooks, and other portable devices, have become more and more technically advanced and multifunctional. For example, portable devices have network connectivity capabilities. Users can use their portable devices to connect to networks at anytime and anywhere. The convenience and new functionalities advanced by modern technology have made these devices into necessities of life.

Furthermore, with the coming of IOT (Internet Of Things) generation, every device or object can connect to networks, and users can access and control these devices or objects via networks. The rapid development of IOT is fortunate that the underlying foundation of wireless network technology is already very mature. Electronic devices can readily connect with each other to perform related applications via wireless networks. Additionally, the BLE (Bluetooth Low Energy) technology has solved the prohibitive power consumption issue caused by prolonged connections of electronic devices to wireless networks. For example, a beacon device is a low-cost wireless Bluetooth transmitter implemented with BLE technology, which can transmit Bluetooth signals via a wireless network for a long time. A mobile phone implemented with BLE technology can wirelessly seek Bluetooth signals to discover corresponding beacon device.

Currently, a large amount of innovative applications are developed using beacon devices. In other words, wireless signals corresponding to various applications can exist in the air. The identification data corresponding to beacon devices of an application must be input to an electronic device using the application in advance, such that the electronic device can only handle the wireless signals with the identification data. Conventionally, a user must manually read the identification data from the corresponding beacon devices one by one, and input the obtained identification data to an application in the electronic device. In another conventional art, a user can press a button on the beacon device, thus driving the beacon device to generate the corresponding identification data. At the time, an electronic device can wireless scan related signals to obtain the identification data of the beacon device. Since above conventional arts both need manually operations for the beacon devices one by one, and related users need professional skills to finish the operations, it is inefficient and hard to implement.

BRIEF SUMMARY OF THE INVENTION

Methods and systems for registering detection of electronic devices are provided, wherein a registration process is performed for electronic devices, and related detection managements are performed for the registered electronic devices.

In an embodiment of a method for registering detection of electronic devices, a first signal is wirelessly received by an electronic device, wherein the first signal is broadcasted by a first electronic device, and the first signal at least includes identification data and specific information corresponding to the first electronic device. The specific information includes motion information of the first electronic device, or specific data generated based on the motion information. Then, a registration process is performed for the first signal by first determining whether the specific information conforms to predefined information. When the specific information conforms to the predefined information, the identification data corresponding to the first electronic device is registered. Signals having the registered identification data will be further processed in the electronic device.

An embodiment of a system for registering detection of electronic devices for use in an electronic device comprises a wireless transceiver and a processing unit. The wireless transceiver wirelessly receives a first signal, wherein the first signal is broadcasted by a first electronic device, and the first signal at least includes identification data and specific information corresponding to the first electronic device. The specific information includes motion information of the first electronic device, or specific data generated based on the motion information. The processing unit performs a registration process for the first signal by first determining whether the specific information conforms to predefined information. When the specific information conforms to the predefined information, the processing unit registers the identification data corresponding to the first electronic device. Signals having the registered identification data will be further processed by the processing unit.

In some embodiments, the electronic device wirelessly receives a second signal, wherein the second signal is broadcasted by a second electronic device, and the second signal at least includes identification data and specific information corresponding to the second electronic device. Then, a detection process is performed for the second signal by first determining whether the identification data corresponding to the second electronic device matches to one of the registered identification data in the electronic device. When the identification data corresponding to the second electronic device does not match to one of the registered identification data in the electronic device, the second signal is ignored. When the identification data corresponding to the second electronic device matches to one of the registered identification data in the electronic device, the specific information in the second signal is processed.

In some embodiments, the specific information in the second signal is processed by retrieving a specific management content from a plurality of management contents according to the specific information, and presenting the specific management content via the electronic device.

In some embodiments, the electronic device comprises a registration mode and a detection mode, and the process procedures for the wireless received signals in the registration mode and the detection mode are different, wherein the electronic device performs the registration process for the received signals in the registration mode, and the electronic device performs the detection process for the received signals in the detection mode. In some embodiments, the electronic device is switched between the registration mode and the detection mode according to an operation via a user interface, or a detection using at least one motion sensor.

In some embodiments, the motion information comprises a specific motion or a specific posture detected by at least one motion sensor of the first electronic device.

In some embodiments, after the identification data corresponding to the first electronic device is registered, the registration process further comprises steps of connecting to the first electronic device by the electronic device via wireless network, and obtaining a plurality of management contents from the first electronic device via the wireless network, or transmitting a plurality of management contents to the first electronic device via the wireless network.

In some embodiments, a wireless connecting unit of the electronic device and a wireless connecting unit of the first electronic device respectively have a peripheral mode and a central mode, wherein the first electronic device broadcasts the first signal in the peripheral mode, and the electronic device receives the first signal in the central mode.

Methods for registering detection of electronic devices may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Methods and system for registering detection of electronic devices are provided.

Figure 1:
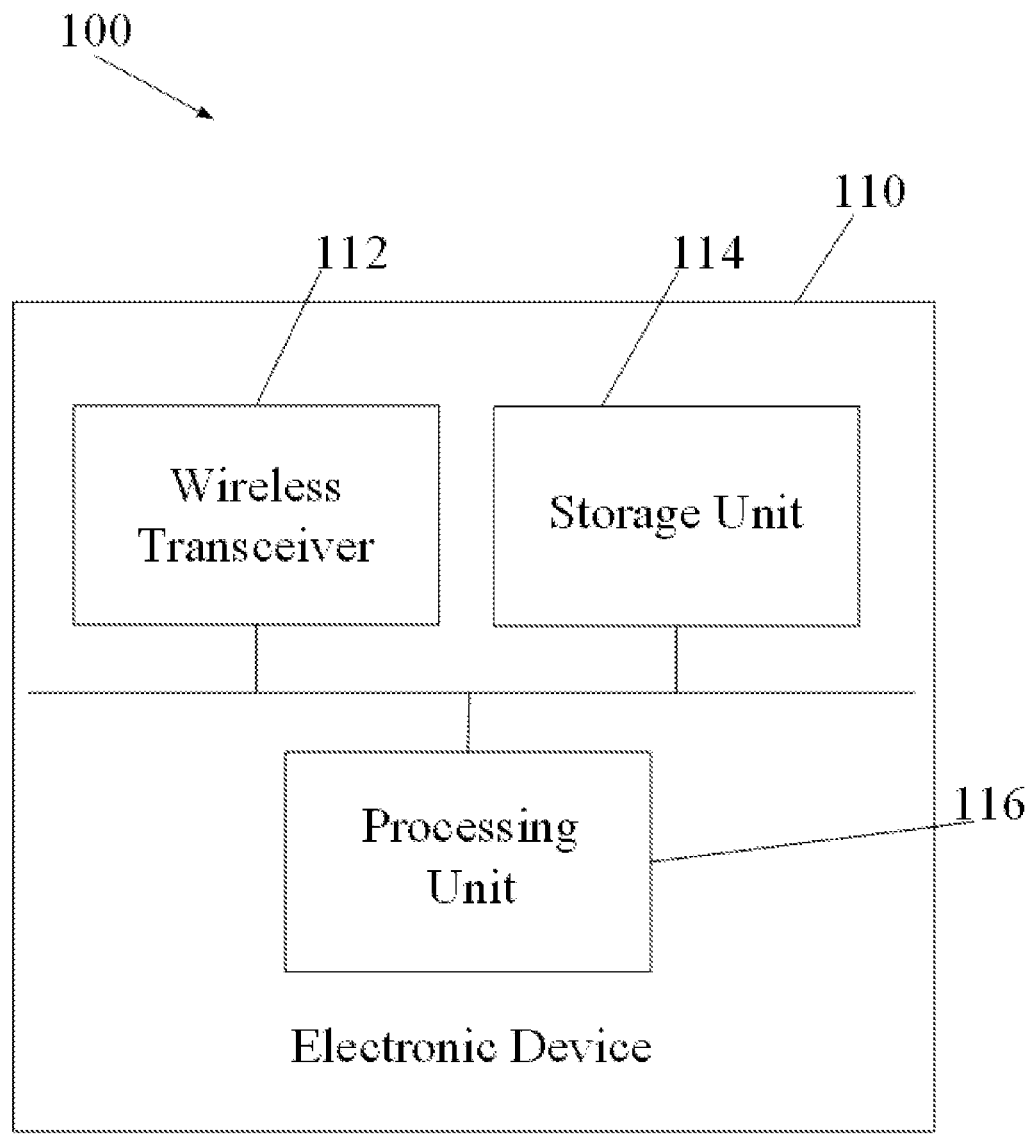
FIG. 1 is a schematic diagram illustrating an embodiment of a system for registering detection of electronic devices of the invention.

FIG. 1 is a schematic diagram illustrating an embodiment of a system for registering detection of electronic devices of the invention. The system for registering detection of electronic devices 100 comprises an electronic device 110, such as a computer or a portable device, such as a mobile phone, a smart phone, a PDA (Personal Digital Assistant), a GPS (Global Positioning System), a notebook, or a tablet computer. As shown in FIG. 1, the electronic device 110 comprises a wireless transceiver 112, a storage unit 114, and a processing unit 116. In some embodiments, the wireless transceiver 112 can be a radio transceiver for broadcasting or receiving data in a specific frequency range, such as VHF or UHF. In some embodiments, the wireless transceiver 112 can be a wireless connecting unit for transmitting and receiving data via a wireless network, such as a Wi-Fi or a Bluetooth network, and/or connecting to any electronic device having wireless network connecting capabilities. The storage unit 114 can store related data. The processing unit 116 can control related operations of hardware and software in the electronic device 110, and perform the methods for registering detection of electronic devices of the present invention, which will be discussed later.

It is understood that, as described, the wireless transceiver 112 may be a wireless connecting unit. In some embodiments, the wireless transceiver 112 may be a network connecting unit implemented with a low-power consumption technology, such as Bluetooth Smart technology. The network connecting unit has two modes, such as a central mode and a peripheral mode. In the central mode, the network connecting unit can receive data from the network connecting units of other electronic devices, and the network connecting unit can actively connect to other electronic devices. In the peripheral mode, the network connecting unit can broadcast signals, such as its identification data. However, the network connecting unit cannot actively connect to other electronic devices in the peripheral mode. In some embodiments, the wireless transceiver 112 is in the central mode.

Figure 2:
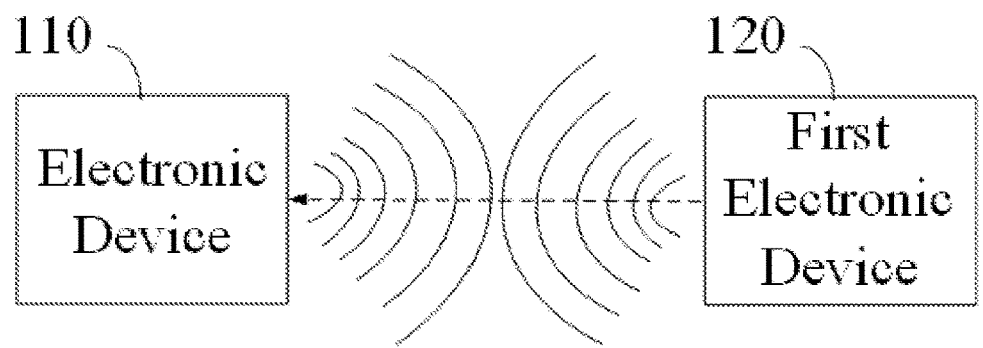
FIG. 2 is a schematic diagram illustrating another embodiment of a system for registering detection of electronic devices of the invention.

FIG. 2 is a schematic diagram illustrating another embodiment of a system for registering detection of electronic devices of the invention. The system for registering detection of electronic devices 100 comprises an electronic device 110 and a first electronic device 120. In some embodiments, the electronic device 110 may be a computer or a portable device, such as a mobile phone, a smart phone, a PDA, a GPS, a notebook, or a tablet computer. In some embodiments, the electronic device 110 can wirelessly receive data transmitted by the first electronic device 120.

Figure 3:
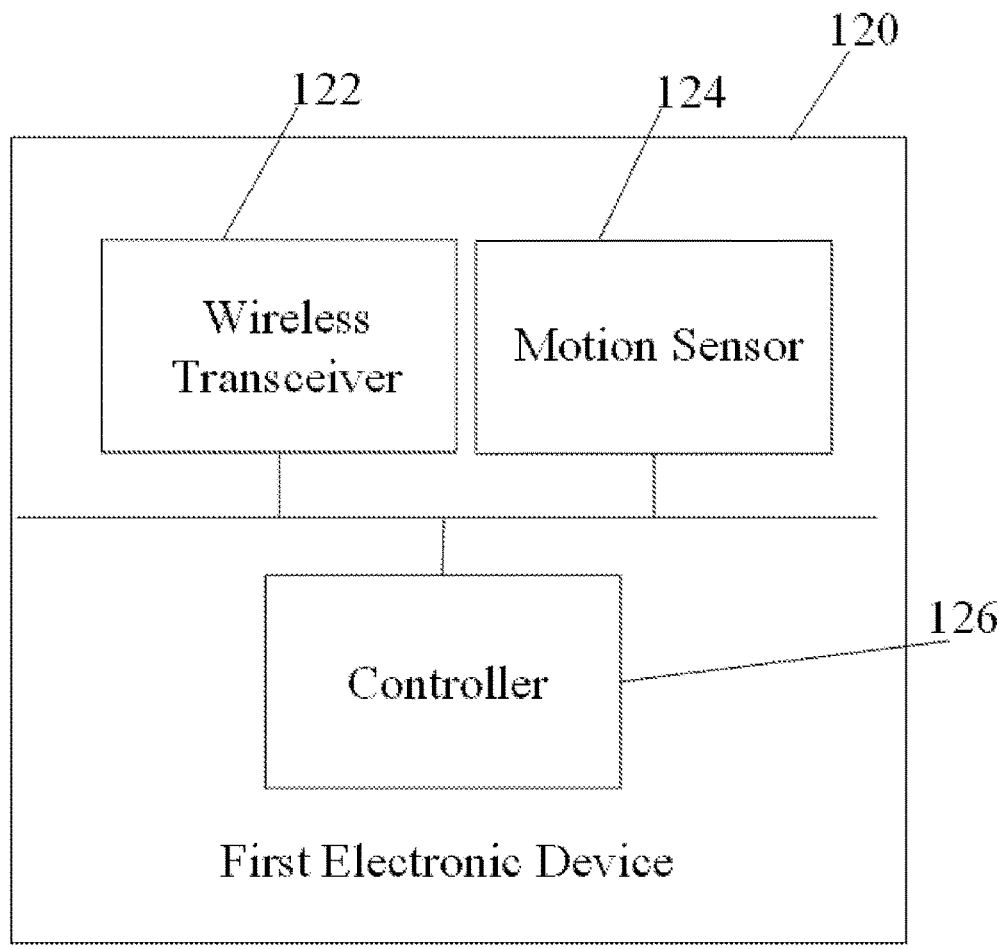
FIG. 3 is a schematic diagram illustrating an embodiment of a first electronic device of the invention.

FIG. 3 is a schematic diagram illustrating an embodiment of a first electronic device of the invention. As shown in FIG. 3, the first electronic device 120 comprises a wireless transceiver 122, a motion sensor 124, and a controller 126.

The wireless transceiver 122 can wirelessly receive or transmit data. In some embodiments, the wireless transceiver 122 can be a radio transceiver for broadcasting or receiving data in a specific frequency range, such as VHF or UHF. In some embodiments, the wireless transceiver 122 can be a wireless connecting unit for transmitting and receiving data via a wireless network, such as a Wi-Fi or a Bluetooth network, and/or connecting to any electronic device having wireless network connecting capabilities. It is understood that, in some embodiments, the wireless transceiver 122 may be a network connecting unit implemented with a low-power consumption technology, such as Bluetooth Smart technology. The network connecting unit has two modes, such as a central mode and a peripheral mode. In the central mode, the network connecting unit can receive data from the network connecting units of other electronic devices, and the network connecting unit can actively connect to other electronic devices. In the peripheral mode, the network connecting unit can broadcast signals, such as its identification data. However, the network connecting unit cannot actively connect to other electronic devices in the peripheral mode. In some embodiments, the wireless transceiver 122 is in the peripheral mode. In other words, the wireless transceiver 122 has data broadcasting capabilities, and the wireless transceiver 122 cannot actively connect to other electronic devices, wherein the wireless transceiver 122 can be passively connected to other electronic devices.

The motion sensor 124 can detect a posture and/or motion corresponding to the first electronic device 120. It is understood that, in some embodiments, the motion sensor 124 may be an accelerometer for generating information of velocity and displacement when the device moves. In some embodiments, the motion sensor 124 may be a Gyro sensor for generating information of angular acceleration when the device moves. It is noted that, the above sensors are only examples of the present application, and the present invention is not limited thereto. Any sensor that can detect the posture and/or motion of an electronic device can be applied in the present invention. The controller 126 can control related operations of hardware and software in the first electronic device 120.

Figure 4:
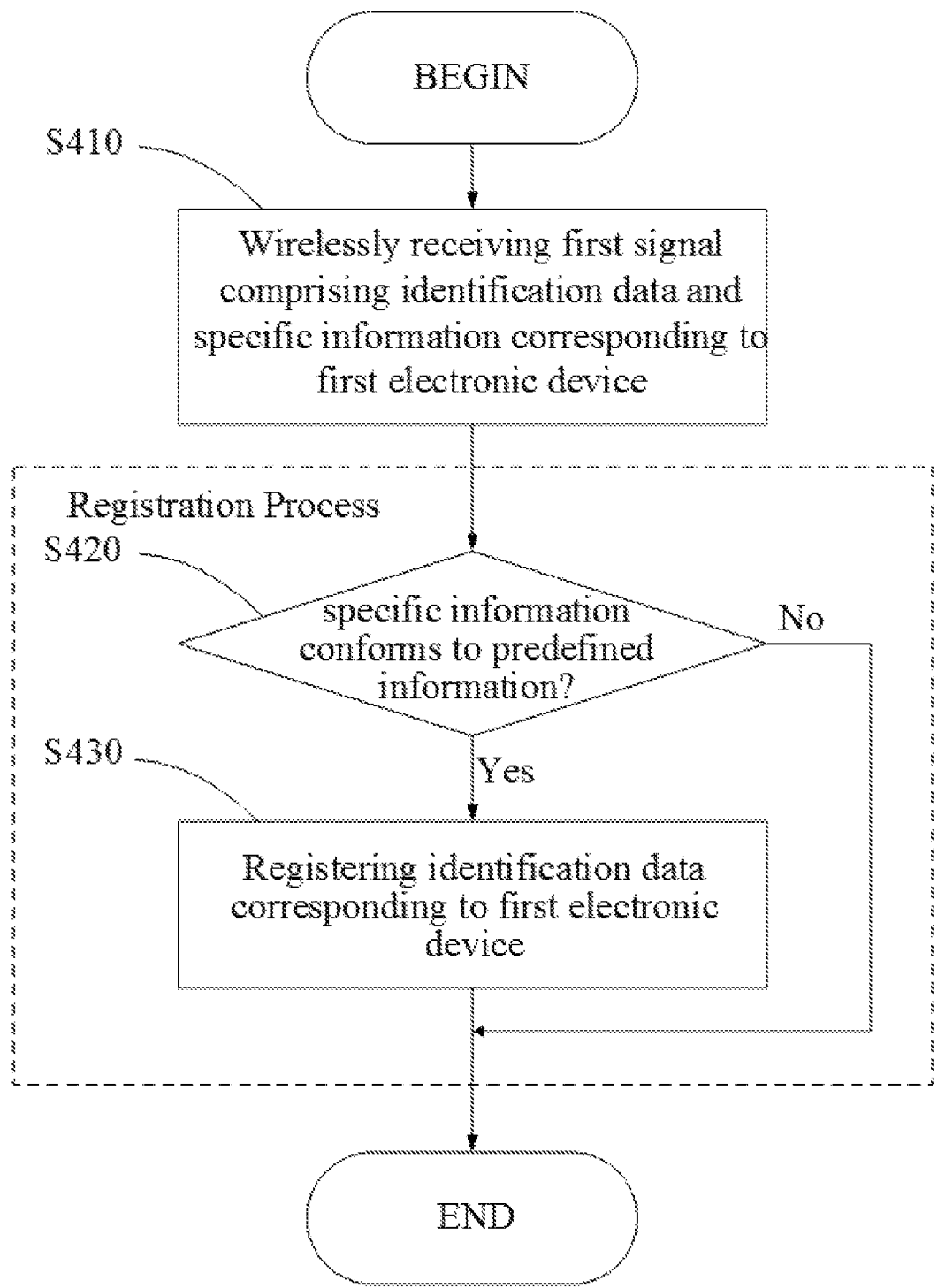
FIG. 4 is a flowchart of an embodiment of a method for registering detection of electronic devices of the invention.

FIG. 4 is a flowchart of an embodiment of a method for registering detection of electronic devices of the invention. The method for registering detection of electronic devices can be used in an electronic device, such as a computer or a portable device, such as a mobile phone, a smart phone, a PDA, a GPS, a notebook, or a tablet computer.

In step S410, a first signal is wirelessly received by the electronic device. It is noted that, the first signal is broadcasted or transmitted by a first electronic device, and the first signal comprises identification data and specific information corresponding to the first electronic device. The specific information comprises motion information of the first electronic device. It is understood that, in some embodiments, the motion information comprises a specific motion or a specific posture detected by at least one motion sensor of the first electronic device. In some embodiments, the first electronic device can generate specific data based on the motion information detected by the motion sensor, and wirelessly broadcast or transmit the generated specific data. In other words, the specific information can comprises specific data generated based on the motion information of the first electronic device. In some embodiments, the specific data can be used to indicate/represent the motion information. It is understood that, in some embodiments, a wireless connecting unit of the electronic device and a wireless connecting unit of the first electronic device can respectively have a peripheral mode and a central mode. The first electronic device broadcasts the first signal in the peripheral mode, and the electronic device receives the first signal in the central mode. Then, a registration process is performed for the received first signal. In the registration process, in step S420, it is determined whether the specific information in the first signal conforms to predefined information preset in the electronic device. When the specific information does not conform to the predefined information (No in step S420), the procedure is completed. When the specific information conforms to the predefined information (Yes in step S420), in step S430, the identification data corresponding to the first electronic device in the first signal is registered. It is noted that, the electronic device can record registered identification data, and only perform further processes for the signals having the registered identification data.

Figure 5:
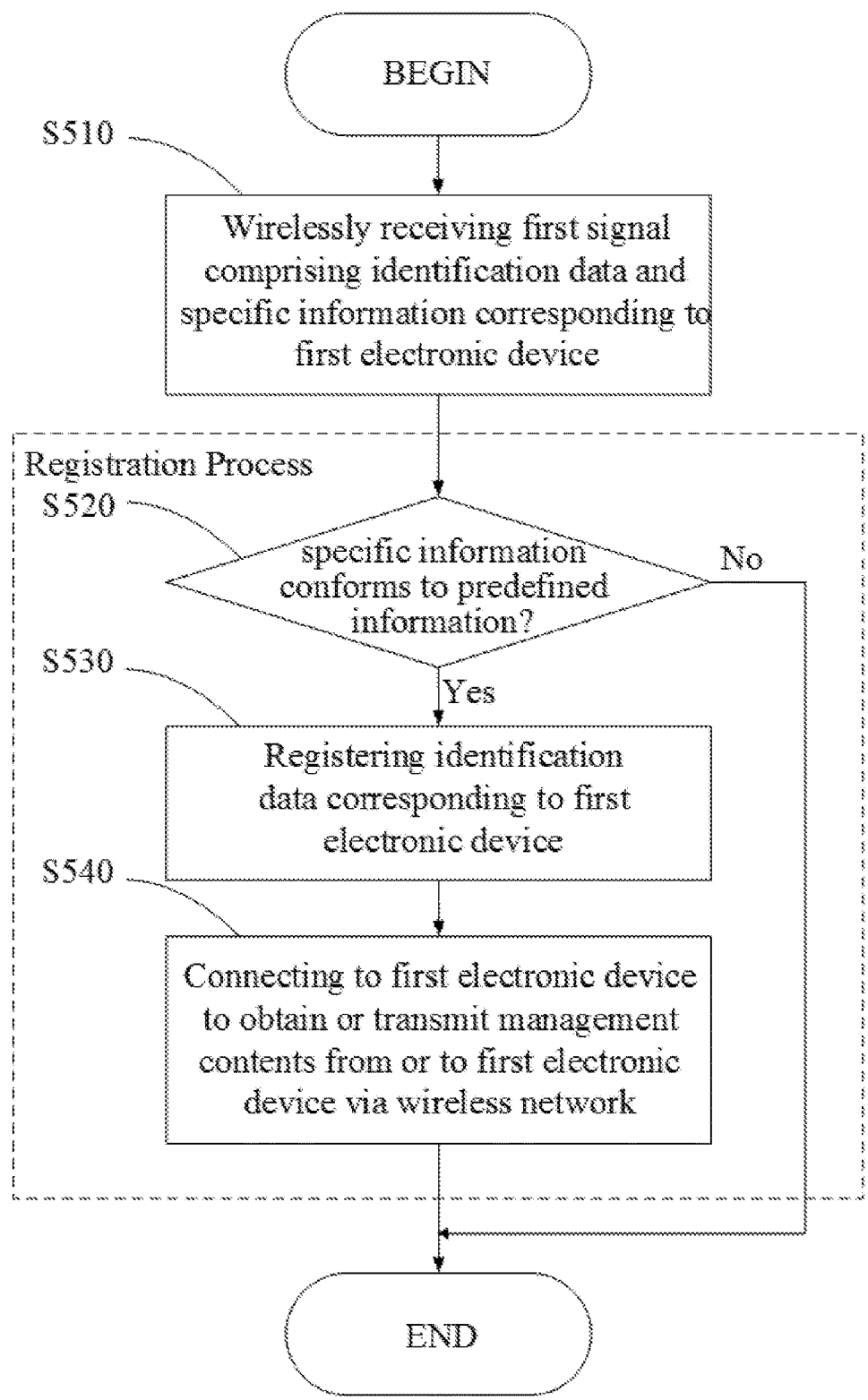
FIG. 5 is a flowchart of another embodiment of a method for registering detection of electronic devices of the invention.

FIG. 5 is a flowchart of another embodiment of a method for registering detection of electronic devices of the invention. The method for registering detection of electronic devices can be used in an electronic device, such as a computer or a portable device, such as a mobile phone, a smart phone, a PDA, a GPS, a notebook, or a tablet computer.

In step S510, a first signal is wirelessly received by the electronic device. It is noted that, the first signal is broadcasted or transmitted by a first electronic device, and the first signal comprises identification data and specific information corresponding to the first electronic device. The specific information comprises motion information of the first electronic device, or specific data generated based on the motion information of the first electronic device. Similarly, in some embodiments, the motion information comprises a specific motion or a specific posture detected by at least one motion sensor of the first electronic device. Similarly, in some embodiments, a wireless connecting unit of the electronic device and a wireless connecting unit of the first electronic device can respectively have a peripheral mode and a central mode. The first electronic device broadcasts the first signal in the peripheral mode, and the electronic device receives the first signal in the central mode. Then, a registration process is performed for the received first signal. In the registration process, in step S520, it is determined whether the specific information in the first signal conforms to predefined information preset in the electronic device. When the specific information does not conform to the predefined information (No in step S520), the procedure is completed. When the specific information conforms to the predefined information (Yes in step S520), in step S530, the identification data corresponding to the first electronic device in the first signal is registered. It is noted that, the electronic device can record registered identification data, and only perform further processes for the signals having the registered identification data. In step S540, the electronic device connects to the first electronic device via a wireless network, such as a Wi-Fi or a Bluetooth network, and obtains a plurality of management contents from the first electronic device via the wireless network, or transmits a plurality of management contents to the first electronic device via the wireless network. It is noted that, the use of the management contents will be discussed later.

Figure 6:
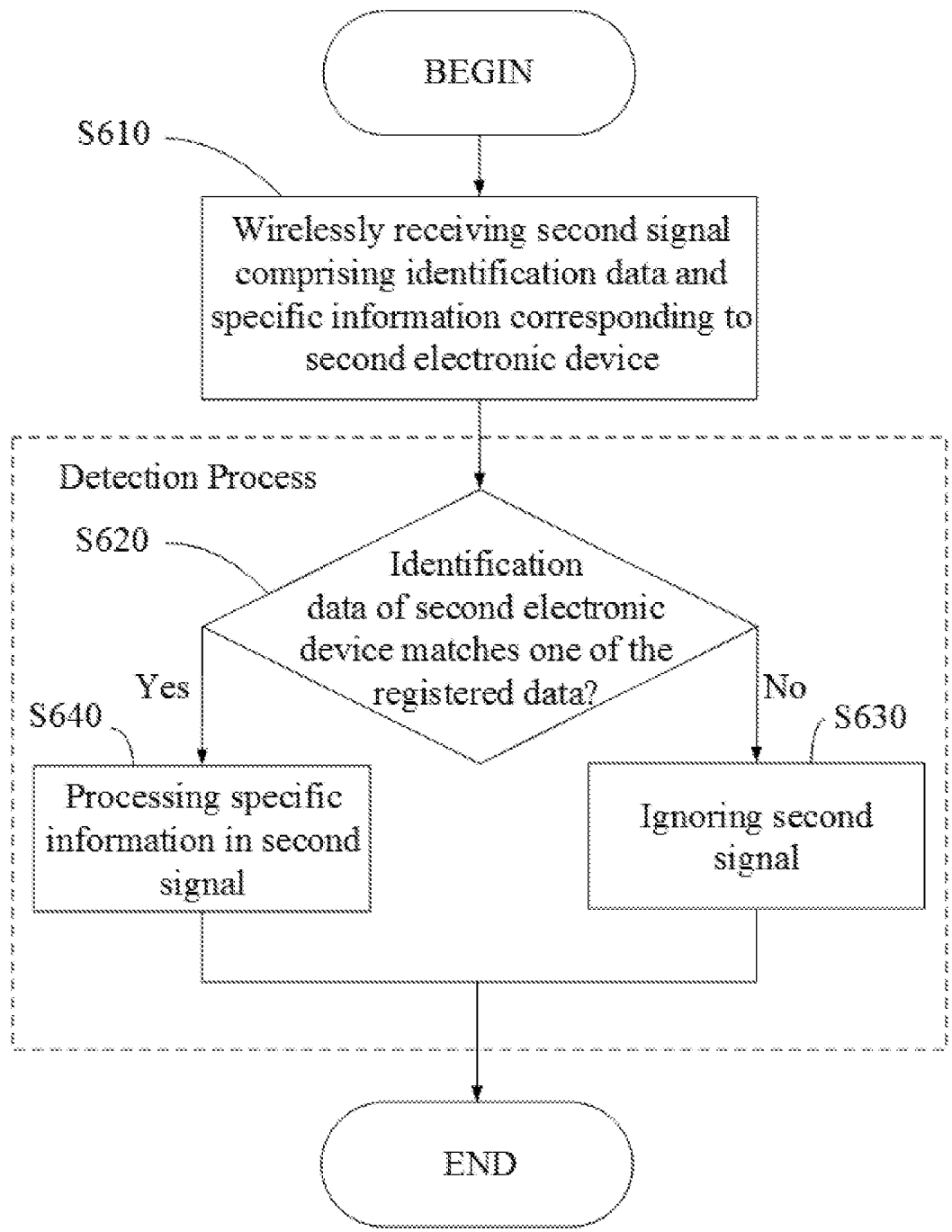
FIG. 6 is a flowchart of another embodiment of a method for registering detection of electronic devices of the invention.

FIG. 6 is a flowchart of another embodiment of a method for registering detection of electronic devices of the invention. The method for registering detection of electronic devices can be used in an electronic device, such as a computer or a portable device, such as a mobile phone, a smart phone, a PDA, a GPS, a notebook, or a tablet computer.

In step S610, a second signal is wirelessly received by the electronic device. It is noted that, the second signal is broadcasted or transmitted by a second electronic device, and the second signal comprises identification data and specific information corresponding to the second electronic device. The specific information comprises motion information of the second electronic device, or specific data generated based on the motion information of the second electronic device. Similarly, in some embodiments, the motion information comprises a specific motion or a specific posture detected by at least one motion sensor of the second electronic device. It is understood that, in some embodiments, a wireless connecting unit of the electronic device and a wireless connecting unit of the second electronic device can respectively have a peripheral mode and a central mode. The second electronic device broadcasts the second signal in the peripheral mode, and the electronic device receives the second signal in the central mode. Then, a detection process is performed for the received second signal. In the detection process, in step S620, it is determined whether the identification data corresponding to the second electronic device in the second signal matches to one of the registered identification in the electronic device. When the identification data corresponding to the second electronic device in the second signal does not match to one of the registered identification in the electronic device (No in step S620), in step S630, the second signal is ignored. As described, the electronic device only performs further processes for the signals having the registered identification data. When the identification data corresponding to the second electronic device in the second signal matches to one of the registered identification in the electronic device (Yes in step S620), in step S640, the specific information in the second signal is processed.

Figure 7:
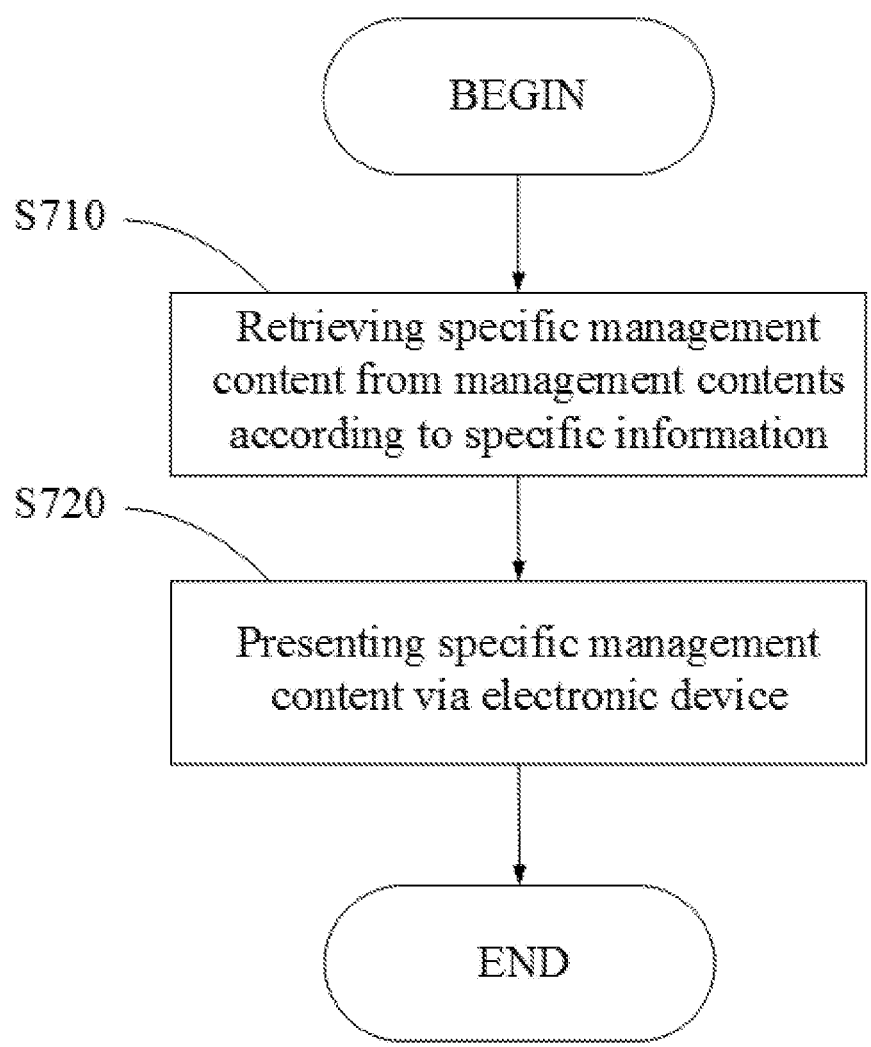
FIG. 7 is a flowchart of an embodiment of a method for processing specific information of the invention.

FIG. 7 is a flowchart of an embodiment of a method for processing specific information of the invention. The method for processing specific information can be used in an electronic device, such as a computer or a portable device, such as a mobile phone, a smart phone, a PDA, a GPS, a notebook, or a tablet computer.

In step S710, a specific management content is retrieved from a plurality of management contents according to the specific information in the received signal. It is noted that, the specific information can comprise motion information of an electronic device which transmitting the signal, or specific data generated based on the motion information of the electronic device which transmitting the signal. Similarly, in some embodiments, the motion information comprises a specific motion or a specific posture detected by at least one motion sensor of the electronic device which transmitting the signal. It is understood that, in some embodiments, the electronic device can have a table for recording the corresponding relationship between the specific information and the management contents. The electronic device can retrieve a corresponding management content from the table according to the specific information. In step S720, the specific management content is presented via the electronic device. It is understood that, in some embodiments, the specific management content can be displayed via a display unit of the electronic device. In some embodiments, the specific management content can be generated and output via a sound output unit of the electronic device. It is noted that, above presentation manners for the specific management content are examples of the application, and the present invention is not limited thereto.

Further, it is noted that, the embodiment of FIG. 7 is only an example of the application. Any process for the specific information can be also applied to the present invention.

Figure 8:
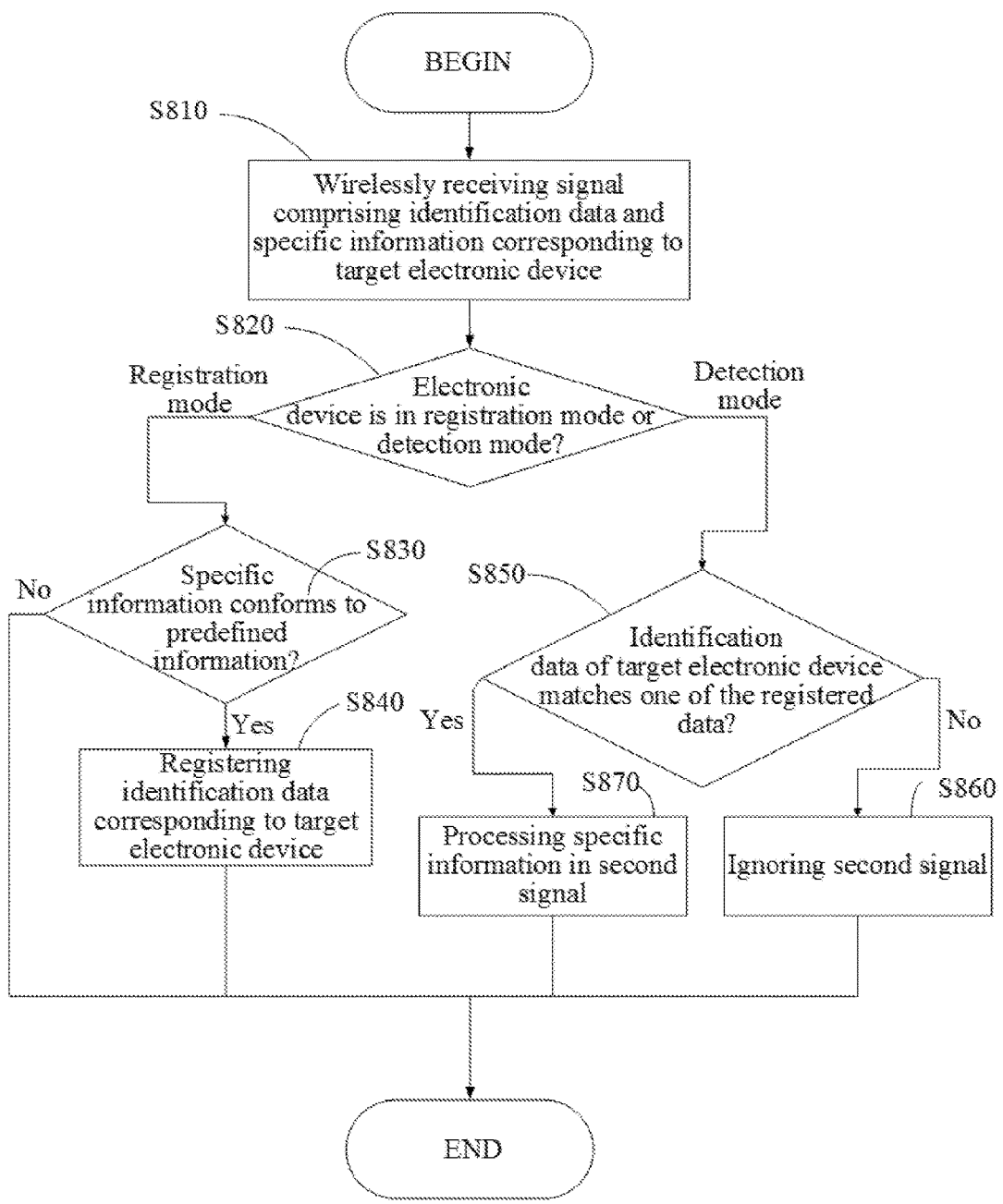
FIG. 8 is a flowchart of another embodiment of a method for registering detection of electronic devices of the invention.

FIG. 8 is a flowchart of another embodiment of a method for registering detection of electronic devices of the invention. The method for registering detection of electronic devices can be used in an electronic device, such as a computer or a portable device, such as a mobile phone, a smart phone, a PDA, a GPS, a notebook, or a tablet computer. It is noted that, the electronic device has a registration mode and a detection mode, and the process procedures for the wireless received signals in the registration mode and the detection mode are different.

In step S810, a signal is wirelessly received by the electronic device. It is noted that, the signal is broadcasted or transmitted by a target electronic device, and the signal comprises identification data and specific information corresponding to the target electronic device. The specific information comprises motion information of the target electronic device, or specific data generated based on the motion information of the target electronic device. It is understood that, in some embodiments, the motion information comprises a specific motion or a specific posture detected by at least one motion sensor of the target electronic device. It is understood that, in some embodiments, a wireless connecting unit of the electronic device and a wireless connecting unit of the target electronic device can respectively have a peripheral mode and a central mode. The target electronic device broadcasts the signal in the peripheral mode, and the electronic device receives the signal in the central mode. In step S820, it is determined whether the electronic device is in the registration mode or the detection mode. It is understood that, in some embodiments, the electronic device can be switched between the registration mode and the detection mode according to an operation via a user interface, or a detection using at least one motion sensor. When the electronic device is in the registration mode, in step S830, it is determined whether the specific information in the signal conforms to predefined information preset in the electronic device. When the specific information does not conform to the predefined information (No in step S830), the procedure is completed. When the specific information conforms to the predefined information (Yes in step S830), in step S840, the identification data corresponding to the target electronic device in the signal is registered. When the electronic device is in the detection mode, in step S850, it is determined whether the identification data corresponding to the target electronic device in the signal matches to one of the registered identification in the electronic device. When the identification data corresponding to the target electronic device in the signal does not match to one of the registered identification in the electronic device (No in step S850), in step S860, the signal is ignored. As described, the electronic device only performs further processes for the signals having the registered identification data. When the identification data corresponding to the target electronic device in the signal matches to one of the registered identification in the electronic device (Yes in step S850), in step S870, the specific information in the second signal is processed. Similarly, in some embodiments, the specific information in the signal can be processed by retrieving a specific management content from a plurality of management contents according to the specific information, and presenting the specific management content via the electronic device, such as displaying or playing back the specific management content.

For example, when an electronic device want to register the identification data corresponding to a target electronic device, the electronic device can enter the registration mode, and a user can instruct the target electronic device to generate a specific motion. At the time, the target electronic device can wirelessly broadcast a signal comprising the identification data corresponding to the target electronic device, and motion information corresponding to the specific motion or specific data generated based on the specific motion. After the electronic device receives the signal, it is determined whether the motion information or the specific data in the signal conforms to the predefined information preset in the electronic device. When the motion information or the specific data in the signal conforms to the predefined information preset in the electronic device, the identification data corresponding to the target electronic device is registered in the electronic device. Then, the electronic device can perform subsequent processes for the signals with registered identification data. In another example, a fixture with a specific posture can be designed for placing multiple target electronic devices at a time. At the time, each target electronic device can wirelessly broadcast a signal comprising the identification data corresponding to the target electronic device, and motion information corresponding to the specific posture or specific data generated based on the specific posture. Similarly, when an electronic device want to register the identification data corresponding to the target electronic devices, the electronic device can enter the registration mode to wirelessly receive the signals transmitted from the respective target electronic devices. The electronic device determines whether the motion information or the specific data in the respective signal conforms to the predefined information preset in the electronic device. When the motion information or the specific data in the respective signal conforms to the predefined information preset in the electronic device, the identification data corresponding to the target electronic device is registered in the electronic device. Then, the electronic device can perform subsequent processes for the signals with registered identification data.

Therefore, the methods and system for registering detection of electronic devices of the present invention can perform a registration process for electronic devices, and perform related detection managements for the registered electronic devices, thereby the complexity of related operations, and improving the efficiency of device registration.

Methods for registering detection of electronic devices, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for executing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for executing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A method for registering detection of electronic devices for use in an electronic device, comprising:
    wirelessly receiving a first signal, wherein the first signal is broadcasted by a first electronic device, the first signal comprises identification data and specific information corresponding to the first electronic device, and the specific information comprises motion information of the first electronic device, or specific data generated based on the motion information; and
    performing a registration process for the first signal, wherein the registration process comprises the steps of:
    determining whether the specific information conforms to predefined information;
    registering the identification data corresponding to the first electronic device when the specific information conforms to the predefined information;
    connecting to the first electronic device by the electronic device via wireless network after the identification data corresponding to the first electronic device is registered in the electronic device;
    obtaining a plurality of management contents from the first electronic device via the wireless network, or transmitting a plurality of management contents to the first electronic device via the wireless network,
    wirelessly receiving a second signal, wherein the second signal is broadcasted by a second electronic device, and the second signal at least includes identification data and specific information corresponding to the second electronic device;
    performing a detection process for the second signal, wherein the detection process comprises the steps of:
    determining whether the identification data corresponding to the second electronic device matches to one of the registered identification data in the electronic device; and
    ignoring the second signal when the identification data corresponding to the second electronic device does not match to one of the registered identification data in the electronic device;
    wherein signals having the registered identification data are further processed in the electronic device.

2. The method of claim 1, further comprising:
    processing the specific information in the second signal when the identification data corresponding to the second electronic device matches to one of the registered identification data in the electronic device.

3. The method of claim 2, wherein the process for the specific information comprises the steps of:
    retrieving a specific management content from a plurality of management contents according to the specific information; and
    presenting the specific management content via the electronic device.

4. The method of claim 1, wherein the electronic device comprises a registration mode and a detection mode, and the process procedures for the wireless received signals in the registration mode and the detection mode are different, in which the electronic device performs the registration process for the received signals in the registration mode, and the electronic device performs the detection process for the received signals in the detection mode.

5. The method of claim 4, the electronic device is switched between the registration mode and the detection mode according to an operation via a user interface, or a detection using at least one motion sensor.

6. The method of claim 1, wherein the motion information comprises a specific motion or a specific posture detected by at least one motion sensor of the first electronic device.

7. The method of claim 1, wherein a wireless connecting unit of the electronic device and a wireless connecting unit of the first electronic device respectively have a peripheral mode and a central mode, in which the first electronic device broadcasts the first signal in the peripheral mode, and the electronic device receives the first signal in the central mode.

8. A system for registering detection of electronic devices for use in an electronic device, comprising:
    a wireless transceiver wirelessly receiving a first signal, wherein the first signal is broadcasted by a first electronic device, the first signal comprises identification data and specific information corresponding to the first electronic device, and the specific information comprises motion information of the first electronic device, or specific data generated based on the motion information; and
    a processing unit performing a registration process for the first signal, wherein the registration process comprises determining whether the specific information conforms to predefined information, registering the identification data corresponding to the first electronic device when the specific information conforms to the predefined information, connecting to the first electronic device by the electronic device via wireless network after the identification data corresponding to the first electronic device is registered in the electronic device, and obtaining a plurality of management contents from the first electronic device via the wireless network, or transmitting a plurality of management contents to the first electronic device via the wireless network, wherein the processing unit is further configured to perform or control the performance of the following operations:

wirelessly receiving a second signal, wherein the second signal is broadcasted by a second electronic device, and the second signal at least includes identification data and specific information corresponding to the second electronic device;

performing a detection process for the second signal, wherein the detection process comprises the steps of:

determining whether the identification data corresponding to the second electronic device matches to one of the registered identification data in the electronic device; and ignoring the second signal when the identification data corresponding to the second electronic device does not match to one of the registered identification data in the electronic device;

wherein signals having the registered identification data are further processed by the processing unit.

9. A non-transitory machine-readable storage medium comprising a computer program, which, when executed, causes a device to perform a method for registering detection of electronic devices for use in an electronic device, wherein the method comprises:

wirelessly receiving a first signal, wherein the first signal is broadcasted by a first electronic device, the first signal comprises identification data and specific information corresponding to the first electronic device, and the specific information comprises motion information of the first electronic device, or specific data generated based on the motion information; and performing a registration process for the first signal, wherein the registration process comprises the steps of:

determining whether the specific information conforms to predefined information;

registering the identification data corresponding to the first electronic device when the specific information conforms to the predefined information;

connecting to the first electronic device by the electronic device via wireless network after the identification data corresponding to the first electronic device is registered in the electronic device;

obtaining a plurality of management contents from the first electronic device via the wireless network, or transmitting a plurality of management contents to the first electronic device via the wireless network, wirelessly receiving a second signal, wherein the second signal is broadcasted by a second electronic device, and the second signal at least includes identification data and specific information corresponding to the second electronic device;

performing a detection process for the second signal, wherein the detection process comprises the steps of:

determining whether the identification data corresponding to the second electronic device matches to one of the registered identification data in the electronic device; and ignoring the second signal when the identification data corresponding to the second electronic device does not match to one of the registered identification data in the electronic device;

wherein signals having the registered identification data are further processed in the electronic device.

* * * * *